(12) United States Patent
Shaikh et al.

(10) Patent No.: US 11,330,343 B2
(45) Date of Patent: May 10, 2022

(54) DYNAMIC VIEWER PREDICTION SYSTEM FOR ADVERTISEMENT SCHEDULING

(71) Applicant: TELEFONAKTIEBOLAGET LM ERICSSON (PUBL), Stockholm (SE)

(72) Inventors: Junaid Shaikh, Sundbyberg (SE); Farnaz Moradi, Stockholm (SE); Valentin Kulyk, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/252,420

(22) PCT Filed: Jul. 5, 2018

(86) PCT No.: PCT/EP2018/068236
§ 371 (c)(1),
(2) Date: Dec. 15, 2020

(87) PCT Pub. No.: WO2020/007470
PCT Pub. Date: Jan. 9, 2020

(65) Prior Publication Data
US 2021/0281925 A1    Sep. 9, 2021

(51) Int. Cl.
*H04N 21/81* (2011.01)
*H04N 21/442* (2011.01)
*H04N 21/458* (2011.01)

(52) U.S. Cl.
CPC ..... *H04N 21/812* (2013.01); *H04N 21/44213* (2013.01); *H04N 21/458* (2013.01)

(58) Field of Classification Search
CPC ........... H04N 21/812; H04N 21/44213; H04N 21/458; H04N 21/23424; G06Q 30/0243
See application file for complete search history.

(56) References Cited

U.S. PATENT DOCUMENTS

| 8,782,683 B2 | 7/2014 | Balakrishnan et al. |
| 9,639,642 B2 | 5/2017 | Jetcheva et al. |

(Continued)

OTHER PUBLICATIONS

International Search Report/Written Opinion dated Aug. 14, 2018 in related/corresponding PCT Application No. PCT/EP2018/068236.

*Primary Examiner* — Jefferey F Harold
*Assistant Examiner* — Timothy R Newlin
(74) *Attorney, Agent, or Firm* — Patent Portfolio Builders PLLC (57) ABSTRACT

Systems and methods are provided for generating a predicted number of viewers in support of selecting an advertisement to be displayed during an advertisement break. The method includes: generating, by an advertisement break class identifier module, a plurality of advertisement break classes based on historical advertisement break information and prediction errors generated by a regression model analysis of advertisement break data samples; evaluating, by the advertisement break class identifier module, the plurality of advertisement break classes; redefining and rearranging, by the advertisement break class identifier module, advertisement break classes from the plurality of advertisement break classes based on the step of evaluating which results in an updated set of advertisement break classes; forwarding, by the advertisement break class identifier module, the updated set of advertisement break classes and trained model information to a prediction module; receiving, modifying and returning prediction model information to the prediction module by a training function in the advertisement break class identifier module; generating, by the prediction module, the prediction of a number of viewers for the advertisement break, wherein a regression model uses the updated set of advertisement break classes and data associated with a specific advertisement break to generate the prediction; and (Continued)

sending, by the prediction module, the prediction of a number of viewers for the advertisement break to a scheduler of advertisements.

20 Claims, 7 Drawing Sheets

(56) References Cited

U.S. PATENT DOCUMENTS

| | | | |
|---|---|---|---|
| 2003/0067554 A1* | 4/2003 | Klarfeld | H04N 21/26283 348/461 |
| 2006/0062363 A1* | 3/2006 | Albrett | H04N 21/4383 379/101.01 |
| 2008/0263578 A1 | 10/2008 | Bayer et al. | |
| 2009/0222316 A1* | 9/2009 | Boinepalli | G06Q 30/0201 705/7.33 |
| 2009/0285551 A1* | 11/2009 | Berry | H04N 5/76 386/249 |
| 2012/0253945 A1* | 10/2012 | Gao | G06Q 30/0275 705/14.71 |
| 2014/0109123 A1* | 4/2014 | Balakrishnan | H04N 21/252 725/14 |
| 2015/0348093 A1* | 12/2015 | Jiang | G06Q 30/0246 705/14.45 |
| 2016/0105699 A1* | 4/2016 | Luzzi | H04N 21/252 725/14 |
| 2016/0225014 A1* | 8/2016 | Mitra | G06Q 30/0243 |
| 2017/0161772 A1* | 6/2017 | Xu | G06N 3/08 |
| 2017/0161773 A1* | 6/2017 | Xu | G06N 20/00 |
| 2020/0126100 A1* | 4/2020 | Goyal | G06F 16/285 |
| 2020/0233703 A1* | 7/2020 | Eleftheriadis | G06F 1/26 |
| 2021/0281925 A1* | 9/2021 | Shaikh | G06Q 30/0243 |

* cited by examiner

DYNAMIC VIEWER PREDICTION SYSTEM FOR ADVERTISEMENT SCHEDULING

TECHNICAL FIELD

The present invention generally relates to operations within television networks and, more particularly, to generating viewership predictions of media content for use in advertisement selections.

BACKGROUND

Currently, there are a large number of devices which receive content which is displayed to a large number of viewers. Both the quantity of devices and the quantity of viewers is expected to continue to grow over time as both the population grows and the quantity of people able to receive such content also increases. The various types of content which people can watch, or listen to, leads to having various audiences that watch such content. Along with receiving content, viewers also receive advertisements associated with, for example, various products and services.

Generating an accurate prediction of a number of people belonging to different target groups watching an advertisement during a television (TV) program, or other delivered media content, is important as the prediction allows for the optimized scheduling of advertisements. Based on information, such as who will be watching TV generally, and an advertisement break particularly, at a certain time can help broadcasters to find suitable commercials for the right advertisement break. Inaccurate prediction of the number of people belonging to different target groups watching an advertisement can result in lost revenue for broadcasters as the advertisement breaks are not scheduled optimally possibly resulting in a lower than contracted quantity of viewers. In other words, the over commitment, by the broadcaster, of the number of viewers for the scheduled advertisement break can lead to advertisers being dissatisfied as the number of viewers will be below the predicted number of viewers potentially resulting in the broadcaster either losing or returning monies to the advertiser. Therefore, to be able to place commercials optimally with respect to advertisement breaks, accurate predictions regarding the quantity of viewers can be a desirable input.

Currently used prediction models are trained without differentiating between the advertisement breaks. TV programs vary in their characteristics, and therefore, the currently used models may be better in predicting viewership of advertisement breaks broadcasted by one type of program, but the currently used models may be worse in predicting viewership of advertisement breaks broadcasted in other types of programs. Further complicating the models' ability to generate accurate predictions are the various types of programs that are broadcast. For example, there are programs that are broadcasted daily, programs that are broadcasted seasonally or single run programs when there is, for example, a particular event happening in a certain geographical region at a certain time. Models which are trained on data that is unbalanced, i.e., data which has a large majority of one type of program, can lead to the accuracy of the predictions being reduced for other types of programs as the models are biased towards the program that is associated with the majority of the data.

Existing solutions predict views or viewer ratings of TV advertisements regardless of changes in programs over time. The programs on TV change continuously, with new programs introduced with new characteristics and possibly different target audiences which can further complicate predictions of viewership numbers and models associated with those predictions.

Thus, there is a need to provide methods and systems that overcome the above-described drawbacks associated with viewership predictions and models for advertisement selection.

SUMMARY

Embodiments described herein provide for a prediction of viewer ratings for advertisement breaks. More specifically, embodiments use time-varying composition and decomposition of classes of advertisement breaks using deep error analysis and regression models for each class of advertisement break resulting in more accurate viewership predictions which can be used for selecting an advertisement to be displayed in an optimal advertisement break.

According to an embodiment, there is a method for generating a predicted number of viewers in support of selecting an advertisement to be displayed during an advertisement break, the method comprising: generating, by an advertisement break class identifier module, a plurality of advertisement break classes based on historical advertisement break information and prediction errors generated by a regression model analysis of advertisement break data samples; evaluating, by the advertisement break class identifier module, the plurality of advertisement break classes; redefining and rearranging, by the advertisement break class identifier module, advertisement break classes from the plurality of advertisement break classes based on the step of evaluating which results in an updated set of advertisement break classes; forwarding, by the advertisement break class identifier module, the updated set of advertisement break classes and trained model information to a prediction module; receiving, modifying and returning prediction model information from the prediction module by a training function in the advertisement break class identifier module; generating, by the prediction module, the prediction of a number of viewers for the advertisement break, wherein a regression model uses the updated set of advertisement break classes and data associated with a specific advertisement break to generate the prediction; and sending, by the prediction module, the prediction of a number of viewers for the advertisement break to a scheduler of advertisements.

According to an embodiment, there is a system for generating a predicted number of viewers in support of selecting an advertisement to be displayed during an advertisement break, the system comprising: an advertisement break class identifier module configured to generate a plurality of advertisement break classes based on historical advertisement break information and prediction errors generated by a regression model analysis of advertisement break data samples; the advertisement break class identifier module configured to evaluate the plurality of advertisement break classes; the advertisement break class identifier module configured to redefine and rearrange advertisement break classes from the plurality of advertisement break classes based on the step of evaluating which results in an updated set of advertisement break classes; the advertisement break class identifier module configured to forward the updated advertisement break classes and trained model information to a prediction model; the advertisement break class identifier module configured to receive, modify and return prediction model information to the prediction module; the prediction module configured to generate the prediction of a number of viewers for the advertisement break, wherein a regression model uses the updated advertisement break classes and data associated with a specific advertisement break to generate the prediction; and the prediction module configured to send the prediction of a number of viewers for the advertisement break to a scheduler of advertisements.

According to an embodiment, there is a computer-readable storage medium containing a computer-readable code that when read by a processor causes the processor to perform a method for generating a predicted number of viewers in support of selecting an advertisement to be displayed during an advertisement break, the method comprising: generating, by an advertisement break class identifier module, a plurality of advertisement break classes based on historical advertisement break information and prediction errors generated by a regression model analysis of advertisement break data samples; evaluating, by the advertisement break class identifier module, the plurality of advertisement break classes; redefining and rearranging, by the advertisement break class identifier module, advertisement break classes from the plurality of advertisement break classes based on the step of evaluating which results in an updated set of advertisement break classes; forwarding, by the advertisement break class identifier module, the updated set of advertisement break classes and trained model information to a prediction module; receiving, modifying and returning prediction model information to the prediction module by a training function in the advertisement break class identifier module; generating, by the prediction module, the prediction of a number of viewers for the advertisement break, wherein a regression model uses the updated set of advertisement break classes and data associated with a specific advertisement break to generate the prediction; and sending, by the prediction module, the prediction of a number of viewers for the advertisement break to a scheduler of advertisements.

According to an embodiment, there is an apparatus adapted to generate a plurality of advertisement break classes based on historical advertisement break information and prediction errors generated by a regression model analysis of advertisement break data samples; evaluate the plurality of advertisement break classes; redefine and rearrange advertisement break classes from the plurality of advertisement break classes based on the step of evaluating which results in an updated set of advertisement break classes; forward the updated advertisement break classes and trained model information to a prediction model; receive, modify and return prediction model information to the prediction module; generate the prediction of a number of viewers for the advertisement break, wherein a regression model uses the updated advertisement break classes and data associated with a specific advertisement break to generate the prediction; and send the prediction of a number of viewers for the advertisement break to a scheduler of advertisements.

According to an embodiment, there is an apparatus including: a first module configured to generate a plurality of advertisement break classes based on historical advertisement break information and prediction errors generated by a regression model analysis of advertisement break data samples; the first module further configured to evaluate the plurality of advertisement break classes; the first module further configured to redefine and rearrange advertisement break classes from use based on the step of evaluating; the first module further configured to generate an updated set of advertisement break classes to a prediction module; the first module further configured to forward the updated set of advertisement break classes and trained model information to a prediction model which is a second module; the first module further configured to receive, modify and return prediction model information to the prediction module by a training function in the advertisement break class identifier module; the second module configured to generate the prediction of a number of viewers for the advertisement break, wherein a regression model uses the updated advertisement break classes and data associated with a specific advertisement break to generate the prediction; and the second module further configured to send the prediction of a number of viewers for the advertisement break to a scheduler of advertisements.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with viewership predictions and models for advertisement selection. Embodiments described herein provide for systems and methods that learn from data and errors over time, form, reform and update classes of advertisement breaks, train a specialized regression model for each advertisement break class and generate accurate predictions of viewer ratings. According to an embodiment, the accuracy of the predictions can improve over time as the system learns over time. The predictions are then used to optimize the scheduling of advertisements for each advertisement break time slot.

Prior to describing the embodiments which generate the predictions and other models, an overview of the framework for predicting viewer ratings for advertisement breaks is now described. Embodiments provide methods and systems to predict the viewer ratings, which can be the expected quantity of viewers, for advertisement breaks based on learning from information gathered, such as, the broadcasted programs and advertisement breaks on television (TV) over time coupled with the use of continuous regression error analysis. Embodiments differentiate themselves from currently used techniques at least by merging an advertisement break classifier, where a sample advertisement break classifier includes information on a specific advertisement break containing different attributes and viewer ratings of the specific advertisement break, with one or more regression models.

According to an embodiment, the advertisement break classifier can distinguish between different classes of advertisement breaks based on TV channels, target audience groups, and potentially other attributes, such as, characteristics of programs broadcasted around advertisement, time of day, days of the week, season, weather, etc. The composition and decomposition of classes continues over time after prediction of every batch of advertisement breaks. The identified advertisement break classes are forwarded to regression models which are trained specifically for the different classes of advertisement break. A feature extraction function extract features dynamically based on the given class of advertisement break, e.g., the system may learn from previous predictions that it is better in predicting the viewer ratings of non-prime time (daytime and midnight) advertisement breaks but suffers in predicting the prime time (evening) advertisement breaks.

For this case, the features needed for predicting viewership of prime-time advertisement breaks could be significantly different from the features needed for the non-prime time advertisement breaks. Therefore, separate feature extraction and selection can be performed for each of the defined classes. Thus, in this example, two different classes can be formed, one each for prime time and non-prime time with separate features and regression models used for each advertisement break class. This can improve the prediction model accuracy due to the use of a specialized regression model for each class of advertisement break.

Figure 1:
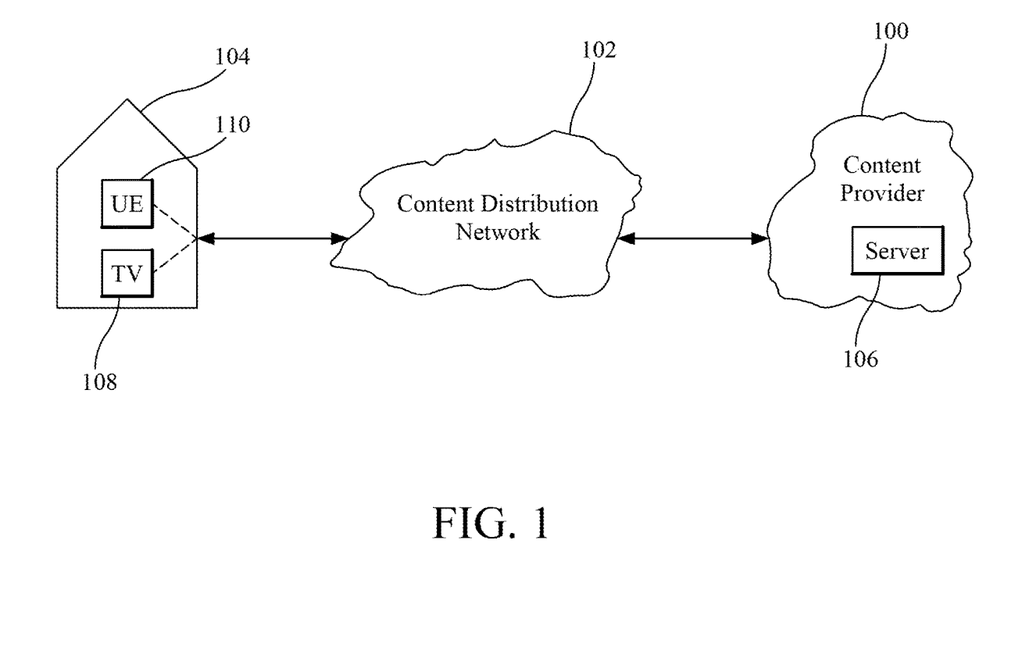
FIG. 1 shows a framework for delivering media content according to an embodiment.

According to an embodiment, a framework in which media content including advertisements is delivered is now described with respect to FIG. 1. According to an embodiment, FIG. 1 includes a content provider 100, a content distribution network 102 and viewer's home 104. The content provider 100 includes a server 106 which represents one or more computing systems which can implement the systems and methods described herein associated with, for example, prediction models and advertisement break classifications. The content distribution network 102 represents the various systems in which media content is delivered, e.g., cable networks, fiber optic networks, wireless networks, combinations of these networks, etc. The viewer's home includes various devices, e.g., user equipment (UE) 110 and TV 108, which can receive the media content to include advertisements. It is to be understood that multiple viewers receive content over a plurality of devices. Additionally, while server 106 is shown to be a part of the content provider 100, the server 106 could be located and operated by a third party and/or distributed among one or more cloud servers.

Figure 2:
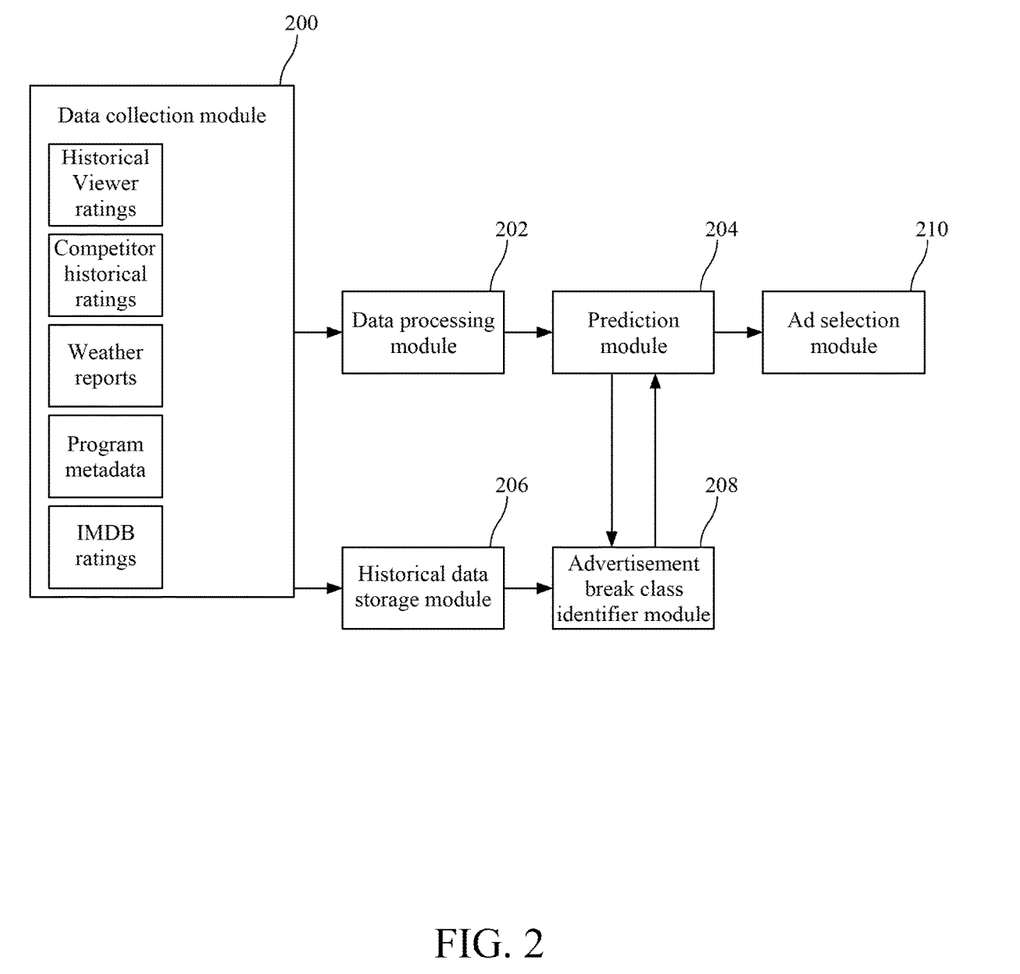
FIG. 2 depicts modules and a flow of information which are used in generating a prediction of a number of viewers for supporting advertisement selection according to an embodiment.

According to an embodiment, FIG. 2 shows the modules and a flow of information which are used in generating a prediction of a number of viewers for supporting advertisement selection. FIG. 2 includes a data collection module 200, a data processing module 202, a prediction module 204, a historical data log module 206, an advertisement break class identifier module 208 and an advertisement selection module 210. The data collection module 200 collects and stores data from various sources. The sources can include: TV channel consumption data from smart TVs, TV program guide information, weather reports, ratings of lists of broadcasted TV programs, e.g., Internet movie database (IMDB), news, user activity on social media regarding TV content and the like. For example, hybrid broadcast broadband TV (HbbTV) provides web-based signaling of user behavior, such as zapping between channels. Similarly, Nielsen TV ratings provide the measurement of TV viewership for a target group sampled at different locations. The weather forecast can be collected using available application programming interfaces (APIs), such as the Dark Sky API which provides measurement of various weather metrics for a given location. IMDB ratings can be collected using an API provided by IMDB to collect ratings from their web page. Text analytics can be used to find numerical features from the text of news targeted news services webpages.

The data processing module 202 receives current and relatively current data from the data collection module 200. The data processing module 202 then processes the data into formats useable by the prediction module 204 and forwards the processed data to the prediction module 204. The historical data storage module 206 receives historical data from the data collection module 200. The historical data storage module 206 then processes the data into formats useable by the advertisement break class identifier module 208 and forwards the processed historical data to the advertisement break class identifier module 208. Both the data processing module 202 and the historical data storage module 206 can operate in a continuous or relatively continuous fashion and iterate when new data is provided.

The prediction module 204 receives inputs from both the data processing module 202 and the advertisement break class identifier module 208 for use in generating viewership predictions for targeted advertisement slots. These predictions are forwarded to the advertisement selection module 210 which selects the advertisements for specific advertisement break slots.

The advertisement break class identifier module 208 generates advertisement break classes based on information received from the historical data storage module 206 and the prediction module 204. The advertisement break class identifier module 204 can also iterate to redefine and rearrange the advertisement break classes. Both the prediction module 204 and the advertisement break class identifier module 208 are described in more detail below with respect to FIGS. 3 and 4, respectively.

According to an embodiment, a minimum set of classes of advertisement breaks can be defined based on some known attributes, such as, TV channel and target group name, which can be based on demographics. Thus, the prediction models for different TV channels and target groups are trained separately typically using different features which features are targeted for each TV channel and target group. For example, the prediction of viewer ratings for an advertisement break broadcasted on a TV channel "A" and for a target group "X" can be trained on regression model R1, whereas the prediction of viewer ratings for an advertisement break broadcasted on a TV channel "B" and for a target group "Y" can be trained on regression model R2 which is different than regression model R1. The trained models then perform prediction on unseen samples, where a sample includes features associated with an advertisement break belonging to a certain class. For example, the sample can include information describing or associated with any combination of: time, title, TV channel, target audience group, the program showing before the advertisement break, the program showing after the advertisement break, program metadata, weather forecast metrics, ratings of programs and consumption of statistics from historical data.

According to embodiments, a number of evaluation metrics can be used to estimate the quality of prediction for each advertisement break, such as, error, absolute error, square error and absolute percentage error. These error metrics can be stored in memory and analyzed by an error analyzer function which is a part of the advertisement break class identifier module 208. If the values of the error metrics for certain samples are significantly different from the other samples of the same class, these samples are further passed on to a filter function in the advertisement break class identifier module 208 where the filter function investigates the attributes and features of these selected advertisement break.

According to an embodiment, these selected samples are then compared with samples of other classes. If certain new common attributes and/or characteristics are identified between different samples, one or more new classes are defined. New regression models can be trained for all available samples in historical data that belong to the newly formed classes. These new regression models can then be used to predict the number of viewers for these sample. This overall process associated with analyzing, reforming and even removing the advertisement break classes can be iterated.

Figure 3:
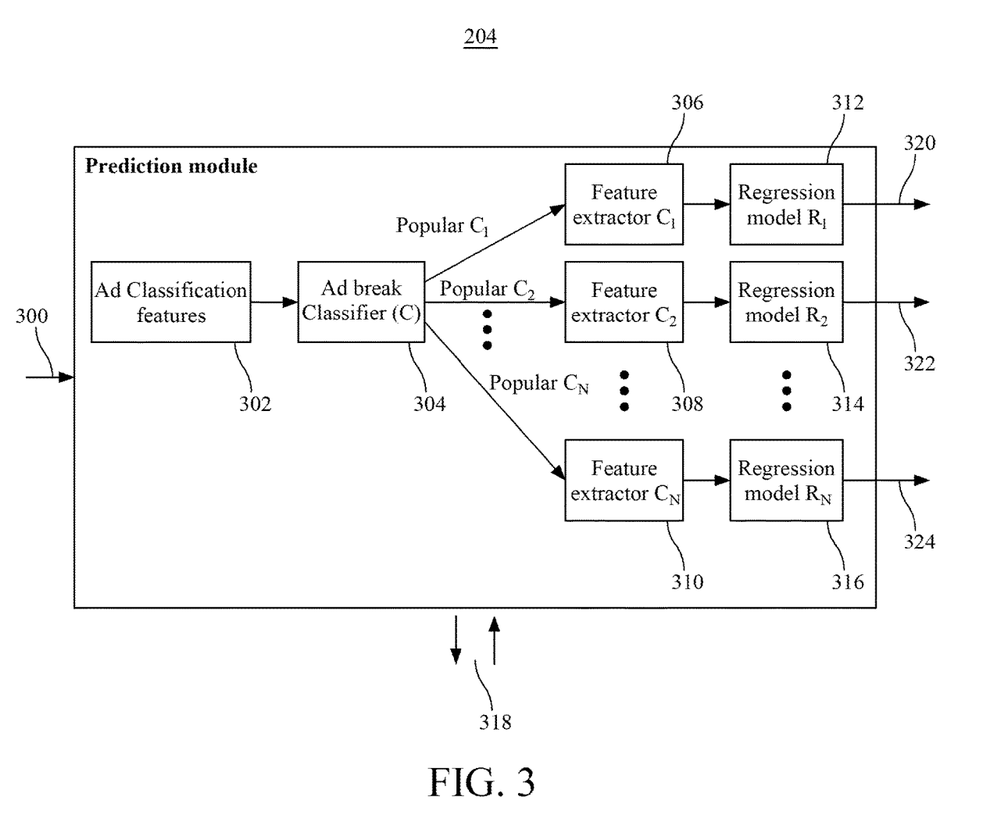
FIG. 3 illustrates a prediction module according to an embodiment.

As described above, there is a prediction module 204 which will now be described in more detail with respect to FIG. 3. Initially, as shown by arrow 300, the prediction module receives a sample from the Data Collection Module 200. The prediction module 204 includes a number of functions for generating a prediction of viewers for an advertisement break based on the received sample (represented by arrow 300) and information received (represented by arrows 318) from the advertisement break class identifier module 208. The functions included in the prediction module include an advertisement classification features function 302, an advertisement break classifier function 304, a plurality of feature extractors 306, 308 and 310 and a plurality of regression models 312, 314 and 316.

According to an embodiment, using classification features as determined by the advertisement classification features module 302, such as, TV channel name, population target group for which the prediction is to be made and, if desired, any combination of such optional features as part of day, prime time or non-prime time, time or season of the year, level of popularity, etc., the sample is labeled with the appropriate class by the advertisement break classification module 304. These classification features are produced using input from the class identifier module. The classified data sample is then forwarded to the appropriate feature extractor ($C_1$-$C_n$) 306, 308 or 310, where, based on the class, the features are extracted. The features are then passed on to the corresponding regression model 312, 314 or 316. The regression model 312, 314 or 316 then generates a prediction of the number of viewers for a given advertisement break.

According to an embodiment, the types of features used for regression in the regression models 312, 314 and 316 include the following features: time schedule related to features; time series statistics of schedule (for example, past ratings for the same time of day, day of the week and/or month, etc.); program metadata which can include genre, description and cast/participants of the programs airing before and after the advertisement break; time series statistics of viewer ratings/consumption of advertisement breaks between similar programs before and after the advertisement breaks in the past; important calendar events, program ratings from one or more databases, e.g., IMDB; and weather metrics, such as temperature, cloud cover and precipitation probability.

According to an embodiment, the prediction of a number of viewers for an advertisement break is provided as an input to the advertisement selection module 210, this can be seen by arrows 320, 322 and 324 which each represent a predicted viewer value from the different regression models 312, 314 and 316. The advertisement selection module 210 can select a desired advertisement using the predicted number of viewers as well as other information as desired.

According to an embodiment, training and evaluation of the regression models 312, 314 and 316 can be continuous which allows for different machine learning (ML) models to be developed over time. However, when initiating or first using the regression models 312, 314 and 316, basic regression models can be used. For example, a weighted combination of K-Nearest Neighbors (KNN), Gradient Boosting Tress (GBT) and Random Forest algorithms can be used alone or in combination. The weights of these algorithms can be learned and varied over time. If a ML algorithm tends to over-estimate the number of viewers and another ML algorithm tends to under-estimate the number of viewers, the weight of each ML algorithm can be determined and implemented based on the extent to which an algorithm over or under estimates the viewer ratings. Regarding model evaluation metrics, according to an embodiment, statistics prediction errors can be generated by using one or more of the following metrics: an error value which can be described as the difference between an actual value and a predicted value; an absolute percentage error; a weighted absolute percentage error; and a square error.

According to an embodiment, there is an advertisement break class identifier module 208 which can continuously compose and decompose advertisement break classes based on both historical data and input received from the prediction module 204. The advertisement break class identifier module 208 is now described in more detail with respect to FIG. 4. The historical data is received from the historical data storage module 206 as represented by arrow 400 and can be samples from varying historical time frames, e.g., previous months or years of data, depending upon availability. The input from the prediction module 204 is represented by arrow 410 and includes predictions and/or prediction errors generated by the regression models 312, 314 and 316. The advertisement break class identifier module 208 includes a features extractor function 404 which extracts various combinations of features, and a model training function 406. The model training function 406 trains the models and learns from errors, as well as providing input to both the prediction module 204, as shown by arrow 408, and the Deep Error Analysis function 402.

Figure 4:
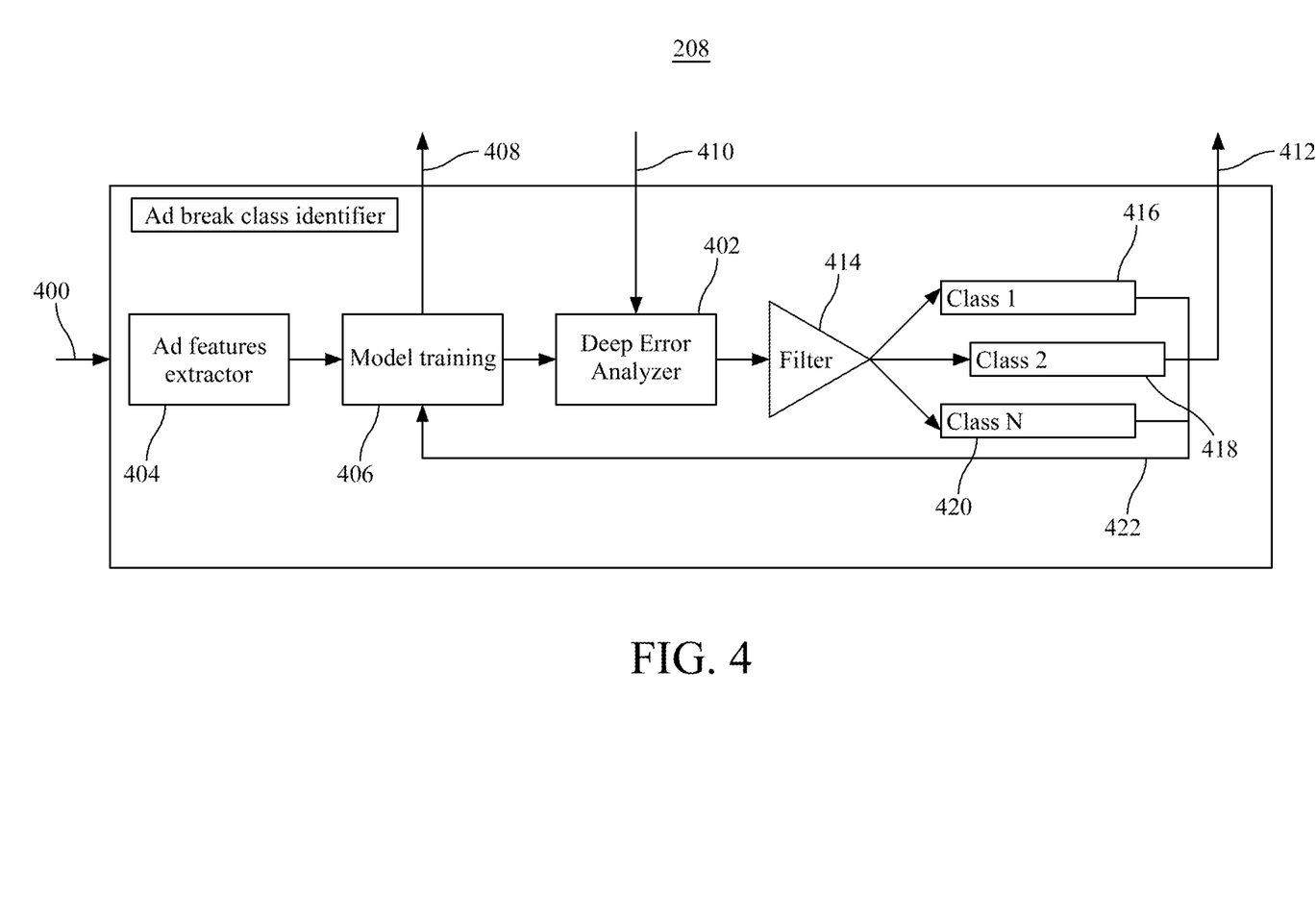
FIG. 4 illustrates an advertisement break class identifier module according to an embodiment.

The model training function 406 also receives its inputs from the features extractor function 404 and from newly generated classes 416, 418 and 420 as shown by the arrow 422. The Deep Error Analysis function 402 also receives inputs from the prediction module 204 and performs an error analysis of predicted samples to determine the best available classes of advertisement breaks in data against which the prediction error becomes minimal. The Deep Error Analyzer function 402 compares values of all error metrics from the current and previous samples of the same class of advertisement break. The Deep Error Analyzer function 402 perform analysis using prediction errors provided by the prediction module, using outlier analysis of the prediction errors, i.e., advertisement breaks which are either highly over estimated or highly under estimated. These results are forwarded to filter 414 which then forms new classes 416, 418 and 420 when appropriate. These new classes 416, 418 and 420 are also communicated to the prediction module 204 as shown by arrow 412.

Figure 5:
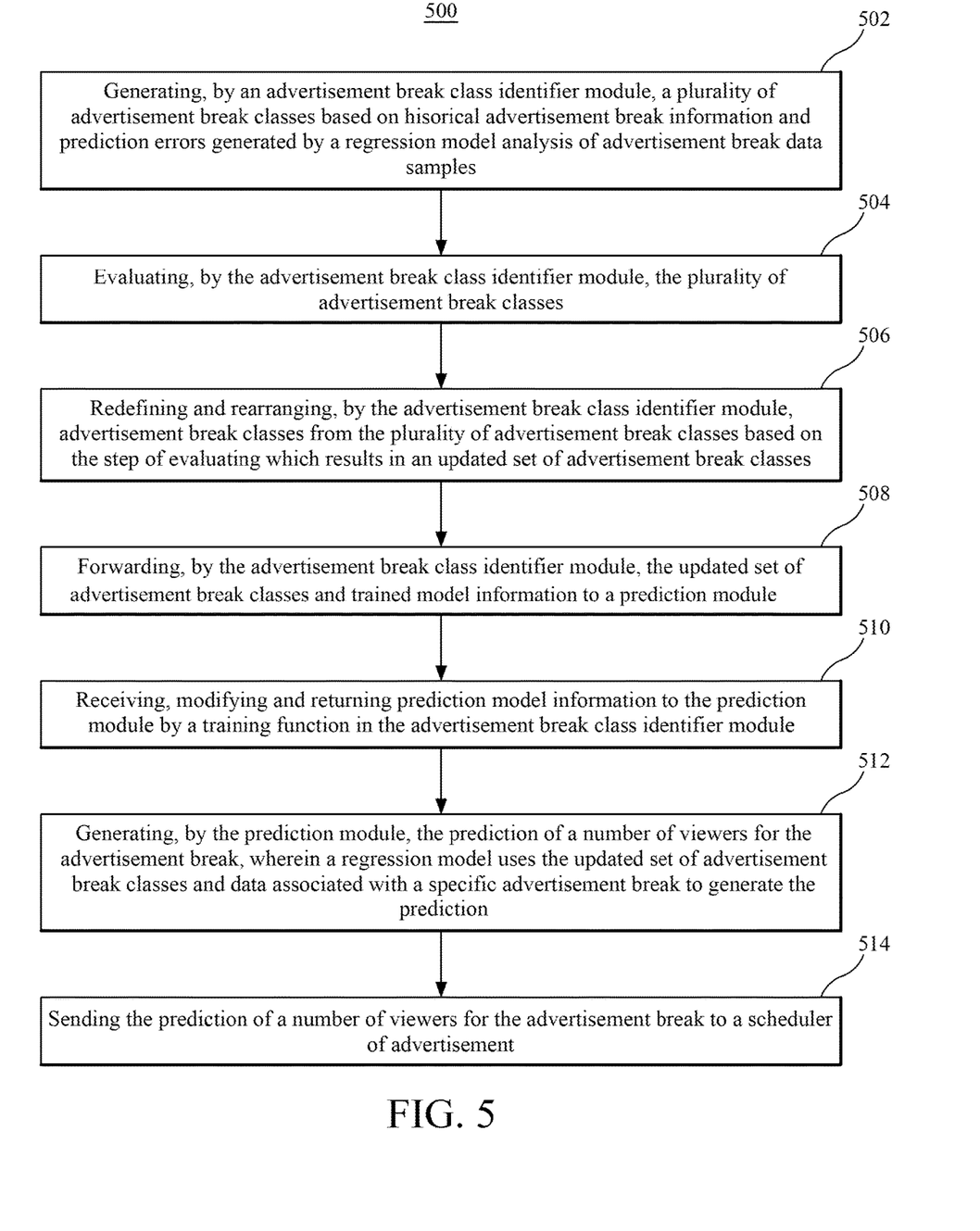
FIG. 5 shows a flowchart of a method for generating a predicted number of viewers in support of selecting an advertisement to be displayed during an advertisement break according to an embodiment.

According to an embodiment there is a flowchart 500 of a method for generating a predicted number of viewers in support of selecting an advertisement to be displayed during an advertisement break as shown in FIG. 5. The method includes: in step 502, generating, by an advertisement break class identifier module, a plurality of advertisement break classes based on historical advertisement break information and prediction errors generated by a regression model analysis of advertisement break data samples; in step 504, evaluating, by the advertisement break class identifier module, the plurality of advertisement break classes; in step 506, redefining and rearranging, by the advertisement break class identifier module, advertisement break classes from the plurality of advertisement break classes based on the step of evaluating which results in an updated set of advertisement break classes; in step 508, forwarding, by the advertisement break class identifier module, the updated set of advertisement break classes and trained model information to a prediction module; in step 510, receiving, modifying and returning prediction model information to the prediction module by a training function in the advertisement break class identifier module; in step 512, generating, by the prediction module, the prediction of a number of viewers for the advertisement break, wherein a regression model uses the updated set of advertisement break classes and data associated with a specific advertisement break to generate the prediction; and in step 514, sending, by the prediction module, the prediction of a number of viewers for the advertisement break to a scheduler of advertisements.

Figure 6:
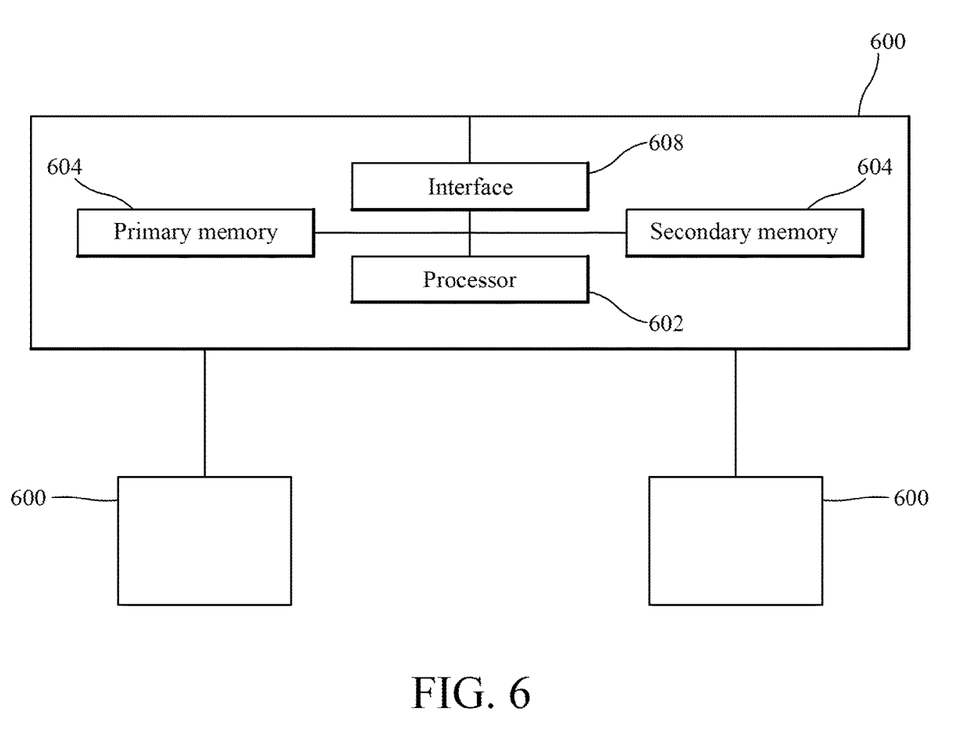
FIG. 6 depicts a group of servers according to an embodiment.

Embodiments described above can be implemented in one or more servers. An example of such a group of servers, which may be in a same physical location or distributed over different locations, is shown in FIG. 6. The server 600 (or other communication node) includes a processor 602 for executing instructions and performing the functions described herein, e.g., the functions associated with the prediction module 204 and the advertisement break classifier module 208. The communication node 600 also includes a primary memory 604, e.g., RAM memory, a secondary memory 606 which is a non-volatile memory, and an interface 608 for communicating with other portions of a network or among various servers if, for example, the various functional modules are distributed over multiple servers. The components of server 600 with the addition of a display are similar to and can also represent a device upon which advertisements are displayed, e.g., TV 108 and UE 110.

Processor 602 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other server 600 components, such as memory 604 and/or 606, server 600 functionality. For example, processor 602 may execute instructions stored in memory 604 and/or 606.

Primary memory 604 and secondary memory 606 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Primary memory 604 and secondary memory 606 may store any suitable instructions, data or information, including software and encoded logic, utilized by network node 600. Primary memory 604 and secondary memory 606 may be used to store any calculations made by processor 602 and/or any data received via interface 608.

Communication node 600 also comprises interface 608 which may be used in the wired or wireless communication of signaling and/or data. For example, interface 608 may perform any formatting, coding, or translating that may be needed to allow communication node 600 to send and receive data over a wired connection. Interface 608 may also include a radio transmitter and/or receiver that may be coupled to or a part of the antenna. The radio may receive digital data that is to be sent out to other network nodes or WDs via a wireless connection. The radio may convert the digital data into a radio signal having the appropriate channel and bandwidth parameters. The radio signal may then be transmitted via an antenna to the appropriate recipient.

According to an embodiment, the methods described herein can be implemented on one or more servers 600 as shown in FIG. 6. These servers can be located at a content provider, at a third-party location or distributed in a cloud architecture. Cloud computing can be described as using an architecture of shared, configurable resources, e.g., servers, storage memory, applications and the like, which are accessible on-demand. Therefore, when implementing embodiments using the cloud architecture, more or fewer resources can be used to, for example, execute the regression models and/or advertisement class break identification, depending upon the amount of information to process and/or the complexity of the algorithms used in the regression models.

Embodiments described herein provide for a prediction of viewer ratings for advertisement breaks. Embodiments provide systems and methods for improving the accuracy of predictions with the objective of optimized advertisement scheduling. This allows for improved matching between advertisements and advertisement break slots. Models can be dynamic and learn over time to change the classes of programs and advertisement breaks based on changes in data. In other words, changes in television (TV) programs are detected, and therefore, new models are trained for advertisement breaks near new programs. Thus, the system can dynamically form new classes of advertisement breaks and remove the old classes of advertisement breaks based on learning from data over time. The formation of classes of advertisement breaks enables training of specialized regression model(s) with features targeted towards each class of advertisement break. Additionally, rarely occurring events that result in a sudden increase or decrease in popularity, i.e., the number of viewers, of advertisement breaks can be treated well with a better accuracy using the embodiments described herein.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 7:
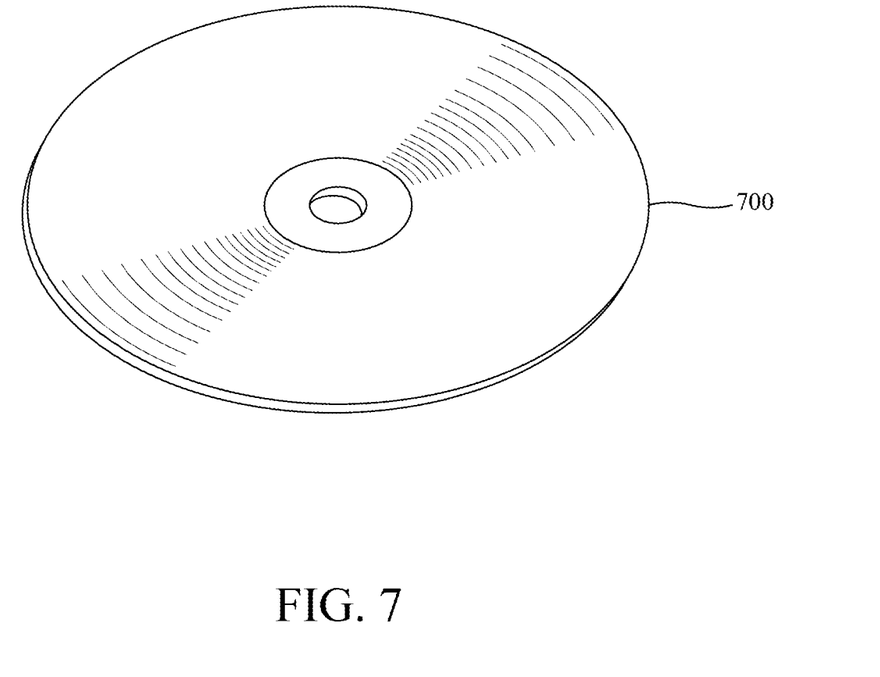
FIG. 7 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments, may take the form of a computer program product stored on a computer-readable storage medium having computer-readable instructions embodied in the medium. For example, FIG. 7 depicts an electronic storage medium 700 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for generating a predicted number of viewers in support of selecting an advertisement to be displayed during an advertisement break, the method comprising:
   generating, by an advertisement break class identifier module, a plurality of advertisement break classes based on historical advertisement break information and prediction errors generated by a regression model analysis of advertisement break data samples;
   evaluating, by the advertisement break class identifier module, the plurality of advertisement break classes;
   redefining and rearranging, by the advertisement break class identifier module, advertisement break classes from the plurality of advertisement break classes based on the step of evaluating which results in an updated set of advertisement break classes;
   forwarding, by the advertisement break class identifier module, the updated set of advertisement break classes and trained model information to a prediction module;
   receiving, modifying and returning prediction model information to the prediction module by a training function in the advertisement break class identifier module;
   generating, by the prediction module, the prediction of a number of viewers for the advertisement break, wherein a regression model uses the updated set of advertisement break classes and data associated with a specific advertisement break to generate the prediction; and
   sending, by the prediction module, the prediction of a number of viewers for the advertisement break to a scheduler of advertisements.

2. The method of claim 1, wherein the steps performed by the advertisement break class identifier module are continuously iterated.

3. The method of claim 1, wherein the historical advertisement break information includes at least one of a time period of historical viewer ratings, competitor historical ratings, weather information, program meta data for programs airing before and after the historical advertisement break and information from program content database ratings.

4. The method of claim 1, wherein the advertisement break data samples include advertisement break start and stop times, unique title of advertisement break, name of television channel displaying the advertisement break, population of an advertisement target group, names and metadata features of television programs displayed before and after the advertisement break, weather forecast metrics, ratings of programs displayed before and after from a program content database, a number of viewers of the programs displayed before and after the advertisement break and name and metadata of programs displayed in competitor channels during the advertisement break.

5. The method of claim 1, wherein the advertisement break classes are based on one or more advertisement classification features, further wherein the one or more advertisement classification features include television channel, population target group, prime time, non-prime time, season and level of popularity.

6. The method of claim 1, wherein the step of evaluating the plurality of advertisement break classes generates model evaluation metrics that include a difference between an actual number of viewers and a predicted number of viewers, an absolute percentage error, a weighted absolute percentage error and a square error.

7. The method of claim 1, being performed by one or more servers distributed in a cloud architecture.

8. The method of claim 1, being performed by one or more servers located in a network of a content provider.

9. The method of claim 1, further comprising:
   displaying the selected advertisement on at least one of a television and a user equipment (UE).

10. The method of claim 1, further comprising:
    applying different advertisement break classes to different advertisement time slots; and
    applying different advertisement break classes to different broadcasted television content types.

11. An apparatus including a processor adapted to generate a plurality of advertisement break classes based on historical advertisement break information and prediction errors generated by a regression model analysis of advertisement break data samples; evaluate the plurality of advertisement break classes; redefine and rearrange advertisement break classes from the plurality of advertisement break classes based on the step of evaluating which results in an updated set of advertisement break classes; forward the updated advertisement break classes and trained model information to a prediction model; receive, modify and return prediction model information to the prediction module; generate the prediction of a number of viewers for the advertisement break, wherein a regression model uses the updated advertisement break classes and data associated with a specific advertisement break to generate the prediction; and send the prediction of a number of viewers for the advertisement break to a scheduler of advertisements.

12. The apparatus of claim 11, wherein the steps performed by the processor to perform advertisement break classes are continuously iterated.

13. The apparatus of claim 11, wherein the historical advertisement break information includes at least one of a time period of historical viewer ratings, competitor historical ratings, weather information, program meta data for programs airing before and after the historical advertisement break and program content database ratings.

14. The apparatus of claim 11, wherein the advertisement break data samples include advertisement break start and stop times, unique title of advertisement break, name of television channel displaying the advertisement break, population of an advertisement target group, names and metadata features of television programs displayed before and after the advertisement break, weather forecast metrics, ratings of programs displayed before and after from a program content database, and a number of viewers of the programs displayed before and after the advertisement break.

15. The apparatus of claim 11, wherein the advertisement break classes are based on one or more advertisement classification features, further wherein the one or more advertisement classification features include television channel, population target group, prime time, non-prime time, season and level of popularity.

16. The apparatus of claim 11, wherein the processor is configured to evaluate the plurality of advertisement break classes and generates model evaluation metrics which include a difference between an actual number of viewers and a predicted number of viewers, an absolute percentage error, a weighted absolute percentage error and a square error.

17. The apparatus of claim 11, wherein the processor is one or more processors located on one or more servers distributed in a cloud architecture.

18. The apparatus of claim 11, wherein the processor is one or more processors located on one or more servers located in a network of a content provider.

19. The apparatus of claim 11, wherein the selected advertisement is displayed on one of a television or a user equipment (UE).

20. The system of claim 11, wherein different advertisement break classes are applied to different advertisement time slots and further wherein different advertisement break classes are applied to different broadcasted television content types.

* * * * *